(12) United States Patent
Silcox et al.

(10) Patent No.: US 8,413,734 B2
(45) Date of Patent: Apr. 9, 2013

(54) CLAMP FOR SPRINKLER SUPPORT ASSEMBLY

(75) Inventors: Paul S. F. Silcox, Wrentham, MA (US); Peter M. MacDonald, Sherborn, MA (US); Norman J. MacDonald, III, Lunenburg, MA (US)

(73) Assignee: Flexhead Industries, Inc., Harvey, IL (US)

( * ) Notice: Subject to any disclaimer, the term of this patent is extended or adjusted under 35 U.S.C. 154(b) by 205 days.

(21) Appl. No.: 12/912,316

(22) Filed: Oct. 26, 2010

(65) Prior Publication Data
US 2012/0097406 A1 Apr. 26, 2012

(51) Int. Cl.
*A62C 2/00* (2006.01)

(52) U.S. Cl.
USPC .................. 169/43; 169/16; 169/37; 169/41; 169/54; 239/209; 239/588; 239/600; 248/56; 248/59; 248/75; 248/214; 248/342; 248/343; 248/73; 248/222.13; 248/226.11; 52/39; 52/506.06; 52/506.07; 285/31

(58) Field of Classification Search ............... 169/16, 169/37, 41, 43, 51, 54; 239/208, 209, 282, 239/283, 588, 600; 248/56, 57, 70, 75, 59, 248/214, 342, 343, 72, 73, 220.21, 222.13, 248/226.11, 228.1, 228.4, 228.13, 231.41; 52/39, 506.06, 506.07; 285/31, 46, 302
See application file for complete search history.

(56) References Cited

U.S. PATENT DOCUMENTS

| 6,119,784 | A | 9/2000 | MacDonald et al. |
| 6,123,154 | A | 9/2000 | MacDonald et al. |
| 6,158,519 | A | * | 12/2000 | Kretschmer | .................... 169/16 |
| 6,260,810 | B1 | * | 7/2001 | Choi | .............................. 248/343 |
| 6,488,097 | B1 | | 12/2002 | MacDonald et al. |
| 6,752,218 | B2 | | 6/2004 | MacDonald et al. |
| 7,032,680 | B2 | | 4/2006 | MacDonald et al. |
| 7,152,834 | B2 | * | 12/2006 | Hsu | .............................. 248/214 |
| 7,255,315 | B2 | | 8/2007 | Oh |
| 7,264,214 | B2 | * | 9/2007 | Oh | ................................ 248/342 |
| 7,735,787 | B2 | | 6/2010 | Kafenshtok |

FOREIGN PATENT DOCUMENTS

JP 6-337082 12/1994
JP 9-196241 7/1997

OTHER PUBLICATIONS

Standard Specification for Nonstructural Steel Framing Members, ASTM International, Aug. 29, 2008—Designation: C645-08a.

(Continued)

*Primary Examiner* — Steven J Ganey
(74) *Attorney, Agent, or Firm* — Kacvinsky Daisak PLLC

(57) ABSTRACT

A fire sprinkler support assembly includes a leg configured to extend transverse to each of a pair of adjacent parallel spaced beams. The leg includes levered clamp assemblies that are configured for connecting and supporting each end of the leg to a corresponding one of the beams. The levered clamp assemblies include a first plate and a second plate, each plate configured to straddle the beam. The levered clamp assemblies also include a lever assembly. The lever assembly includes a rod passing through corresponding rod openings in the first and second plates, and a lever pivotally connected to one end of the rod. The lever includes a cam surface disposed adjacent to the first plate. The lever assembly is configured to reduce spacing between the plates upon actuation of the lever, whereby the leg is secured to the beam.

43 Claims, 8 Drawing Sheets

OTHER PUBLICATIONS

Standard Specification for the Manufacture, Performance, and Testing of Metal Suspension Systems for Acoustical Tile and lay-in Panel Ceilings, ASTM International, Oct. 2004—Designation C 635-04.

Standard Practice for Installation of Metal Ceiling Suspension Systems for Acoustical Tile and Lay-in Panels, ASTM International, Jun. 10, 2004—Designation C 636-04.

Standard Practice for Application for Ceiling Suspension Systems for Acoustical Tile and Lay-in Panels in Areas Requiring Seismic Restraint, ASTM International, May 31, 2006—Designation; E580-02.

Standard Specification for Installation of Steel Framing Members to Receive Screw-Attached Gypsum Panel Products, ASTM International, Aug. 28, 2008—Designation: C754-07.

http://www.muchobeets.com/business/buret%20test%20tube%20clamp.jpg.

http://ecx.images-amazon.com/images/I/41ig%2BOE5QeL.jpg.

\* cited by examiner

CLAMP FOR SPRINKLER SUPPORT ASSEMBLY

The invention relates to a clamp used in a fire protection sprinkler head support system.

BACKGROUND OF THE INVENTION

A typical automatic fire sprinkler system includes a network of pipes that carry a fire suppression fluid, e.g., water, to each room in a building. Conduit sections carry the fluid from the pipes to sprinkler heads strategically located in different rooms. The position and orientation of each sprinkler head is typically maintained in place by a support assembly. When the room reaches an elevated temperature due to a fire, the sprinkler head is activated allowing a stream of fire suppression fluid to be directed over the intended area of coverage. During operation, the fluid pressure at the sprinkler head can reach as high as 175 psi, generating significant back pressure on the sprinkler head's support system. The support assembly is used to hold the sprinkler head securely in place during operation.

Some known sprinkler support assemblies are designed to be secured to a ceiling structure by fasteners such as screws or bolts which must be tightened using special tools in a time consuming process.

SUMMARY

In one aspect, a fire sprinkler support assembly is provided for supporting a flexible fire sprinkler fitting within a ceiling structure having parallel spaced beams. The support assembly includes a leg configured to extend transverse to each of a pair of adjacent ones of the parallel spaced beams. The leg includes a cross portion and a levered clamp assembly for connecting and supporting an end of the cross portion of the leg to a corresponding one of the beams. The levered clamp assembly includes a first plate extending from and generally perpendicular to the cross portion of the leg, a second plate extending generally parallel to the first plate, the second plate being rotatable relative to the first plate. The first plate and the second plate are configured to be disposed on opposing sides of a corresponding one of the beams such that the plates straddle the beam. The levered clamp assembly also includes a lever assembly. The lever assembly includes a rod passing through corresponding rod openings in each of the first and second plates and a lever pivotally connected to one end of the rod, the lever including a cam surface disposed adjacent to the first plate, such that the lever assembly is configured to reduce spacing between the plates upon actuation of the lever, such that the leg is secured to the beam.

One or more of the following features may also be included.

The rod is threaded and the rod opening of the second plate is threaded and configured to engage the threaded rod. The cam surface may include a generally semi-circular peripheral shape. A rotational axis of the lever may be eccentric relative to the periphery of the cam surface. The lever may be pivotally connected to the rod by a pin. The support assembly may include parallel-spaced beams, each beam in the form of T-bar. The second plate may have a protrusion for engaging the beam. The protrusion may extend along a width of the plate. The first plate may have a protrusion for engaging the beam. The protrusion may terminate in a point. The second plate may include stiffening ridges.

The support assembly may include a seating frame. The seating frame may include first and second seating frame members extending perpendicular to the cross portion of the leg, a first protrusion included on the first seating frame member, a second protrusion included on the second seating frame member, and a connecting member configured to connect the first and second seating frame members. The second plate may include a tongue configured to protrude through a tongue opening in the first plate, the second plate rotatable relative to the first plate on the tongue. The tongue may include a curved portion configured to maintain the connection between the first plate and the second plate. The tongue may extend from an edge of the second plate. The tongue opening may be disposed on the first plate at a location between the cross portion of the leg and the rod opening.

The support assembly may include a hub assembly where the hub assembly includes a primary support mounted to the leg, and a secondary support member rotatable relative to a primary support member between an open position and a closed position, and in the closed position, cut outs formed in the primary support cooperate together with cut outs formed in the secondary support to define a hub opening.

The fire protection sprinkler system may include a support assembly and a flexible sprinkler assemblage, the flexible sprinkler assemblage including the flexible fire sprinkler fitting including a first end configured to connect to a flexible fluid supply line, and a second end configured to connect to a fire sprinkler head, and a flexible fluid supply line connected to the first end, where a portion of the flexible fire sprinkler fitting is disposed in the hub opening.

In another aspect, a method of mounting the fire sprinkler support assembly to a ceiling support structure is provided. The support assembly is configured to secure a flexible fire sprinkler fitting to the ceiling support structure, and the ceiling support structure includes parallel spaced beams. The method includes providing the support assembly, positioning the support assembly such that the plates straddle the beam; and actuating the lever to secure the levered clamp assembly to the beam such that the spacing between the plates is reduced to an extent that the beam is compressed between the plates, clamping the support structure to the ceiling.

One or more of the following features may be included.

The beams may include T-bar, the plates may be configured to engage a portion of the T-bar, and the actuating step may include engaging the portion of the T-bar beam. Actuating the cammed lever may be accomplished by rotating the lever such that a camming action is produced between the cam surface and one of the plates. Preceding the securing step, the method may include adjusting the spacing between the plates by rotation of the rod.

The first plate may include a tongue opening, and the second plate may include a tongue configured to protrude through the tongue opening in the first plate, the second plate rotatable relative to the first plate on the tongue; and the positioning step may include rotating the second plate on the tongue to obtain adequate spacing to accept the beam. The second plate may be hinged to the first plate.

In another aspect, a fire sprinkler support assembly is provided for supporting a flexible fire sprinkler fitting within a ceiling structure having parallel spaced beams. The support assembly includes a leg configured to extend transverse to each of a pair of adjacent ones of the parallel spaced beams. The leg includes a cross portion and a levered clamp assembly for connecting and supporting an end of the cross portion of the leg to a corresponding one of the beams. The levered clamp assembly includes a base, a first plate and a second plate, each plate extending from and generally perpendicular to the base, the second plate being generally parallel to the first plate, the first plate and the second plate configured to be disposed on opposing sides of a corresponding one of the beams such that the plates are configured to straddle the beam. The levered clamp assembly also includes a lever assembly. The lever assembly includes a rod passing through corresponding rod openings in each of the first and second plates and a lever pivotally connected to one end of the rod, the lever including a cam surface disposed adjacent to the first plate, such that the lever assembly is configured to reduce spacing between the plates upon actuation of the lever, such that the leg is secured to the beam.

One or more of the following features may also be included.

The rod may be threaded and the rod opening of the second plate may include threads configured to engage the threaded rod. The cam surface may include a generally semi-circular peripheral shape. A rotational axis of the lever may be eccentric relative to the periphery of the cam surface. The lever may be pivotally connected to the rod by a pin. The support assembly may include the parallel-spaced beams, each beam in the form of T-bar. The plates may extend from opposed ends of the base, such that the base and plates define a U-shaped member. The plates may have an inward protrusion for engaging the beam. The protrusion may be elongated. The plates may include stiffening ridges.

The position of the levered clamp assembly may be adjustable along the cross portion of the leg. Each plate may include an opening to receive the cross portion of the leg. The support assembly may include a hub assembly where the hub assembly includes a primary support mounted to the leg, and a secondary support member rotatable relative to a primary support member between an open position and a closed position, and in the closed position, cut outs formed in the primary support cooperate together with cut outs formed in the secondary support to define a hub opening.

The fire protection sprinkler system includes the support assembly and a flexible sprinkler assemblage, the flexible sprinkler assemblage including the flexible fire sprinkler fitting including a first end configured to connect to a flexible fluid supply line, and a second end configured to connect to a fire sprinkler head, and a flexible fluid supply line connected to the first end, such that a portion of the flexible fire sprinkler fitting is disposed in the hub opening.

In another aspect, a method of mounting a support assembly to a ceiling support structure is provided. The support assembly is configured to secure a flexible fire sprinkler fitting to the ceiling support structure, and the ceiling support structure includes parallel spaced beams. The method includes providing the support assembly, positioning the support assembly such that the plates straddle the beam and actuating the lever to secure the levered clamp assembly to the beam such that the spacing between the plates is reduced to an extent that the beam is compressed between the plates, clamping the support structure to the ceiling.

One or more of the following features may be included.

The plates may be configured to engage a portion of a T-bar beam and the actuating step may include engaging the portion of the T-bar beam. Actuating the cammed lever may be accomplished by rotating the lever such that a camming action is produced between the cam surface and one of the plates. Preceding the securing step, the method may include adjusting the spacing between the plates by rotation of the rod. The positioning step may include adjusting the position of the levered clamp assembly along the cross portion of the leg. The plates may extend from opposed ends of the base, such that the base and plates define a U-shaped member.

Embodiments of the invention may have one or more of the following advantages.

The sprinkler support assembly is secured within a ceiling structure using a quick release-type levered clamp that enables sprinkler system installers to quickly install, position, and uninstall sprinkler support assemblies. The amount of time and labor required to install or modify a fire sprinkler support assembly will thus be reduced relative to some known support assemblies (e.g., that are secured to a ceiling structure by screws or bolts).

The clamps are designed to hold a sprinkler head firmly in place during operation by resisting side, rotational, and torsional forces.

The above-mentioned object, other objects, characteristics and advantages of the present invention will become apparent from the detailed description of the embodiment of the invention presented below in conjunction with the attached drawings.

DETAILED DESCRIPTION

Figure 1:
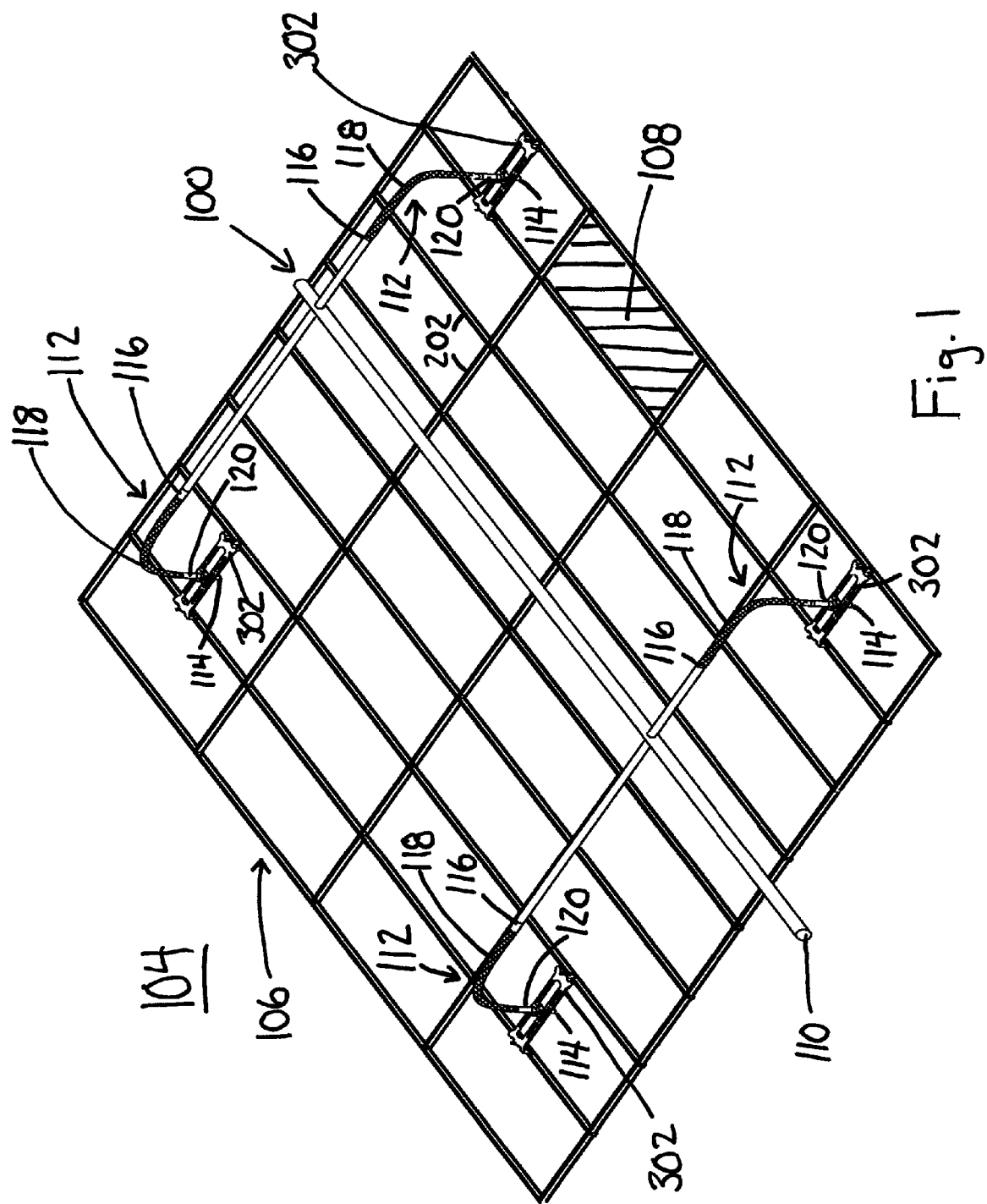
FIG. 1 is a diagrammatic, perspective view of sprinkler support assemblies attached to a suspended ceiling.

With reference to FIG. 1, a fire sprinkler system 100 includes several sprinkler support assemblies 302 mounted within a ceiling 104 having a ceiling support structure 106 formed of an array of rectangular frame sections 108 (one frame section 108 is shown with cross hatch). The ceiling support structure 106 can be a suspended ceiling for supporting a decorative panel (not shown) within each rectangular frame section 108. For example, the ceiling support structure may consist of T-bar beams 202 suspended from an overlying building structure using, for example, flexible wire, and may be configured according to ASTM International standards. The standards may include, but are not limited to, those set forth in one or more of designations C635, C636 and E580, which are each incorporated herein by reference. In order to protect the room from fire, the fire sprinkler system 100 is most commonly located above the ceiling support structure, but can also reside in a floor or in one or more walls.

The fire sprinkler system 100 can include supply pipes 110 as part of a fire suppression fluid delivery system. The fluid delivery system can be dedicated to fire suppression, or can also deliver water to other functions (e.g., within the building). The fire sprinkler system 100 also includes a flexible sprinkler assemblage 112 that carries the fire suppression fluid, e.g. water, from the supply pipes 110 to the fire sprinkler head 114. For example, the flexible sprinkler assemblage 112 can include an inlet fitting 116 which connects the assemblage 112 to the supply pipe 110, and a flexible conduit 118 which extends between the inlet fitting 116 and one end of a rigid sprinkler head fitting 120. The flexible conduit 118 may be formed of corrugated metal with a braided metal covering, and welded to both the inlet fitting 116 and sprinkler head fitting 120, or may be formed of corrugated metal and joined to both the inlet fitting and sprinkler head fitting 120 using screw connectors. The assemblage 112 can further include the sprinkler head 114 which is connected to another end of the sprinkler head fitting 120. When the room reaches elevated temperatures, fire sprinkler head 114 is activated and a stream of fire suppression fluid is directed into the room to extinguish the fire.

Each sprinkler support assembly 302 secures a sprinkler head 114 at a predetermined position within an associated one of rectangular ceiling frame sections 108. In order to function effectively, fire sprinkler head 114 must be held firmly in place during operation. Due to the significant back pressure of the fluid flowing therethrough, fire sprinkler head 114 is subjected to tremendous side, rotational, and torsional forces, which are capable of changing the position of the fire sprinkler head 114, thereby causing the fluid to be directed away from the intended target. The sprinkler support assembly 302 is configured to resist movement of fire sprinkler head 114 by distributing the forces to spaced-apart points along the periphery of one of the rectangular frame sections 108.

Figure 2:
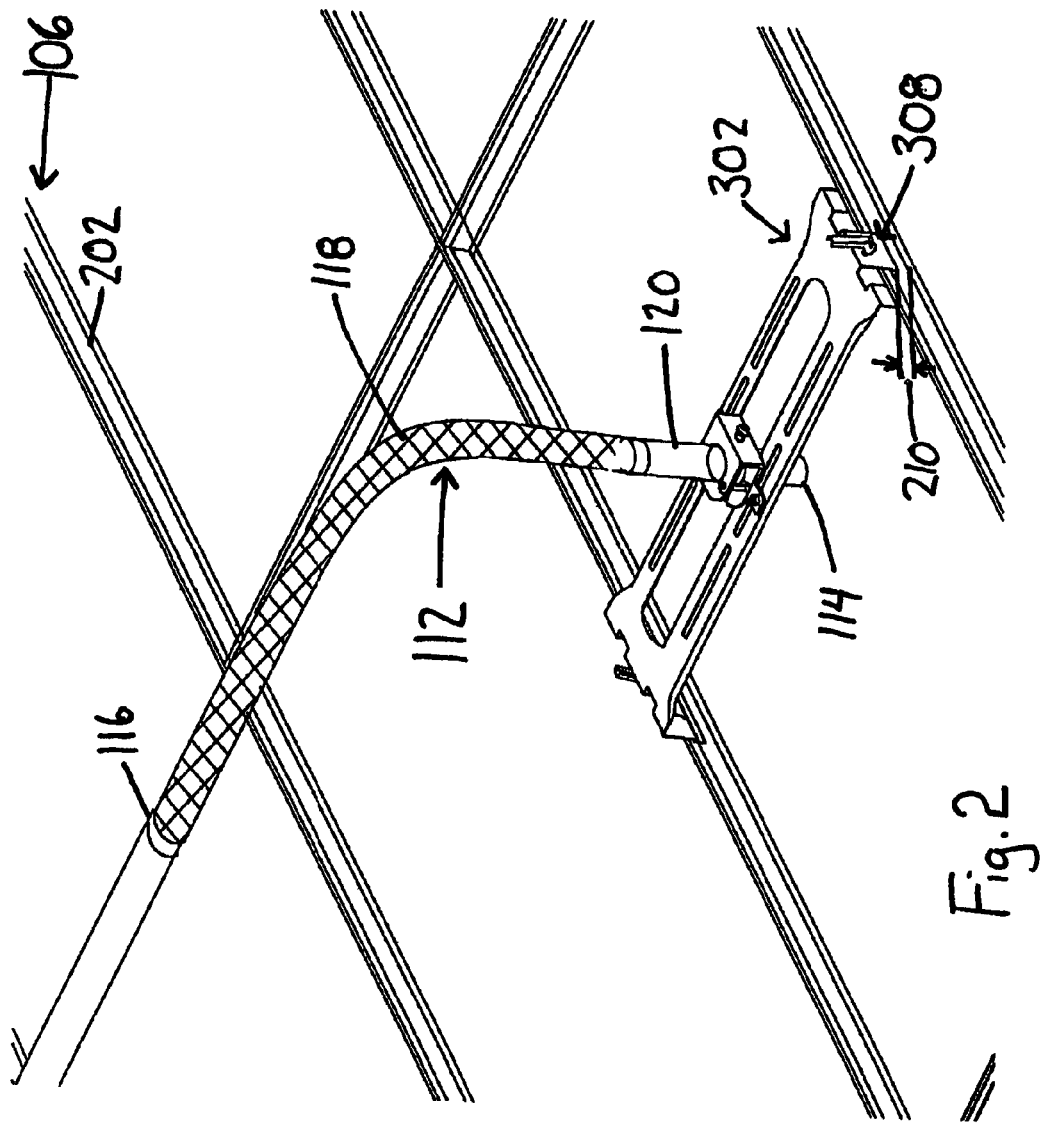
FIG. 2 is a perspective view of one of the support assemblies of FIG. 1 attached to a ceiling support structure.
Figure 3:
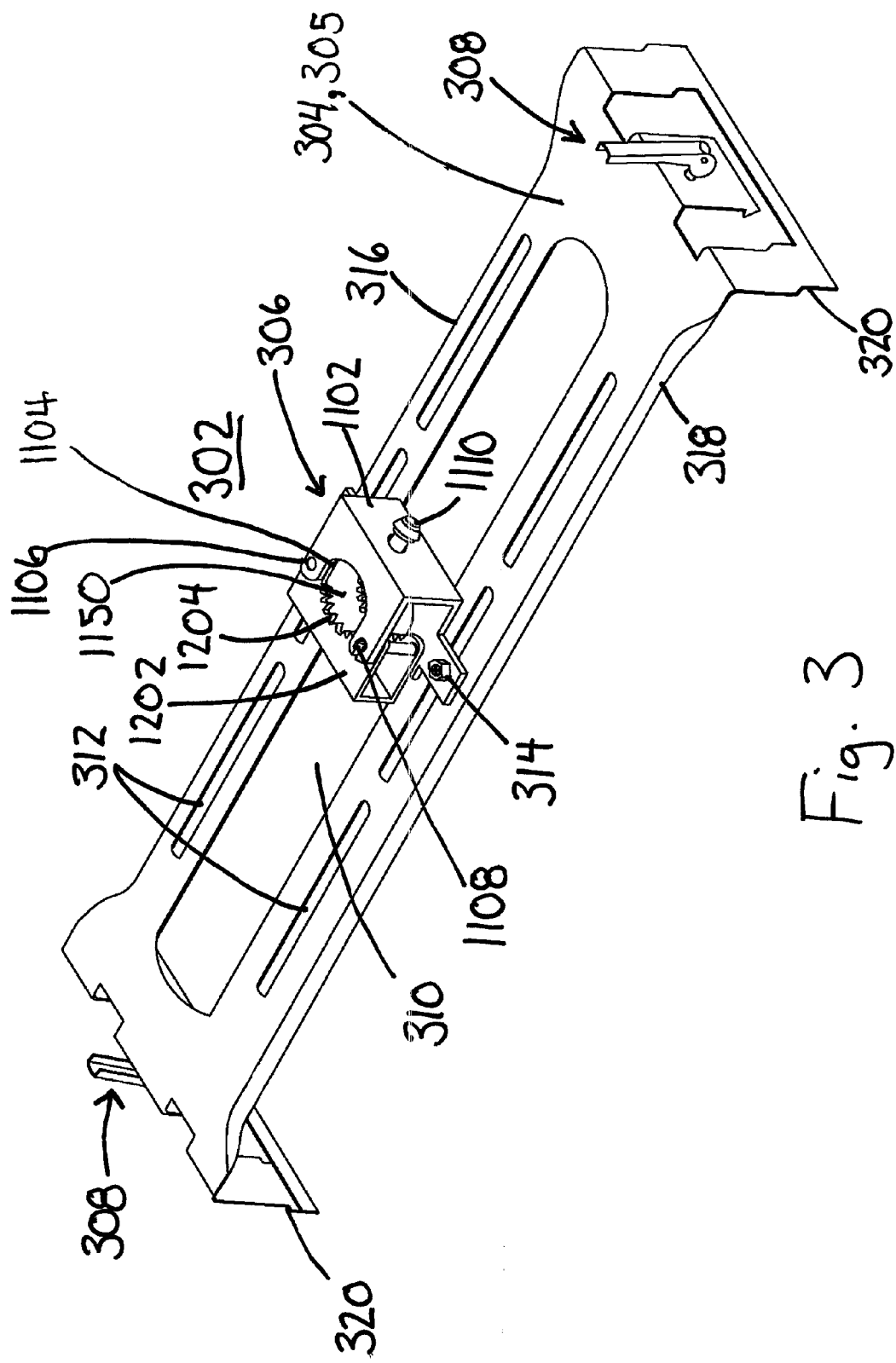
FIG. 3 is a perspective view of a first embodiment of a sprinkler support assembly including levered clamps.

Referring to FIGS. 2 and 3, an exemplary embodiment of a sprinkler support assembly 302 is mounted within a ceiling support structure 106, which, in this example, is a T-bar grid.

The sprinkler support assembly 302 includes a leg 304 including a cross portion 305, and levered clamp assemblies 308 and seating frames 320 positioned at opposing ends of the cross portion 305. The support assembly 302 is rigidly secured to the ceiling support structure 106 by the levered clamp assemblies 308 and stabilized by the seating frames 320. The levered clamp assemblies 308 are configured to engage with a beam 202 of a ceiling support structure 106 and secure the sprinkler support assembly 302 to the beam 202, as discussed further below.

The cross portion 305 of the leg 304 extends generally parallel to the ceiling support structure 106 and is dimensioned to extend across a pair of adjacent parallel T-bar beams 202. The levered clamp assemblies 308 and the seating frames 320, provided at opposed ends of the cross portion 305, make contact with the beam 202 at several points ensuring that the forces on the sprinkler support assembly 302 are distributed along a portion of the ceiling frame section 108. As a result, stability of the sprinkler support assembly 302 is ensured and the sprinkler head 114 is prevented from moving or rotating in any direction during operation.

The cross portion 305 of the leg 304 includes a central slot 310 that is sized to receive the sprinkler head fitting 120, and is elongated in a direction transverse to the width of the leg 304 to permit adjustment of the position of the sprinkler head fitting 120 within the ceiling frame section 108. The cross portion 305 also includes lateral slots 312 sized to receive a hub assembly mounting screw 314. The lateral slots 312 are disposed between the central slot 310 and lateral sides 316, 318 of the leg 304, and are elongated in a direction transverse to the width of the leg 304 to permit adjustment of the location of the screws within the leg 304. The adjustment of the position of the sprinkler head fitting 120 within the frame section 108 is unlimited.

In the illustrated embodiment, a hub assembly 306 is used to secure the sprinkler head fitting 120 to the sprinkler support assembly 302. The hub assembly 306 includes a primary support 1102 which mounts on the leg 304 of the support assembly 302, and a secondary support 1202 that is rotatably connected to the primary support 1102, as described in co-pending U.S. application Ser. No. 12/784,286, which is incorporated here by reference. The secondary support 1202 rotates relative to the primary support 1102 about a pin 1106 between an open position (not shown) and a closed position (shown). The primary support 1102 and secondary support 1202 are each formed having cut out portions 1104, 1204, so that when the secondary support 1202 is in the closed position relative to the primary support 1102, the cut out 1104 formed in the primary support 1102 cooperates with the cut out 1204 formed in the secondary support 1202 to define a hub opening 1150 configured to receive and securely retain the sprinkler head fitting 120. When the hub assembly 306 is secured to the leg 304, the hub opening 1150 coincides with the central slot 310. In addition, the hub assembly 306 includes a locking mechanism 1108 that selectively connects the primary support 1102 to the secondary support 1202, and an adjustment mechanism 1110 provided on the primary support 1102 is used to secure the position of the sprinkler head fitting 120 within the hub opening 1150.

Figure 4:
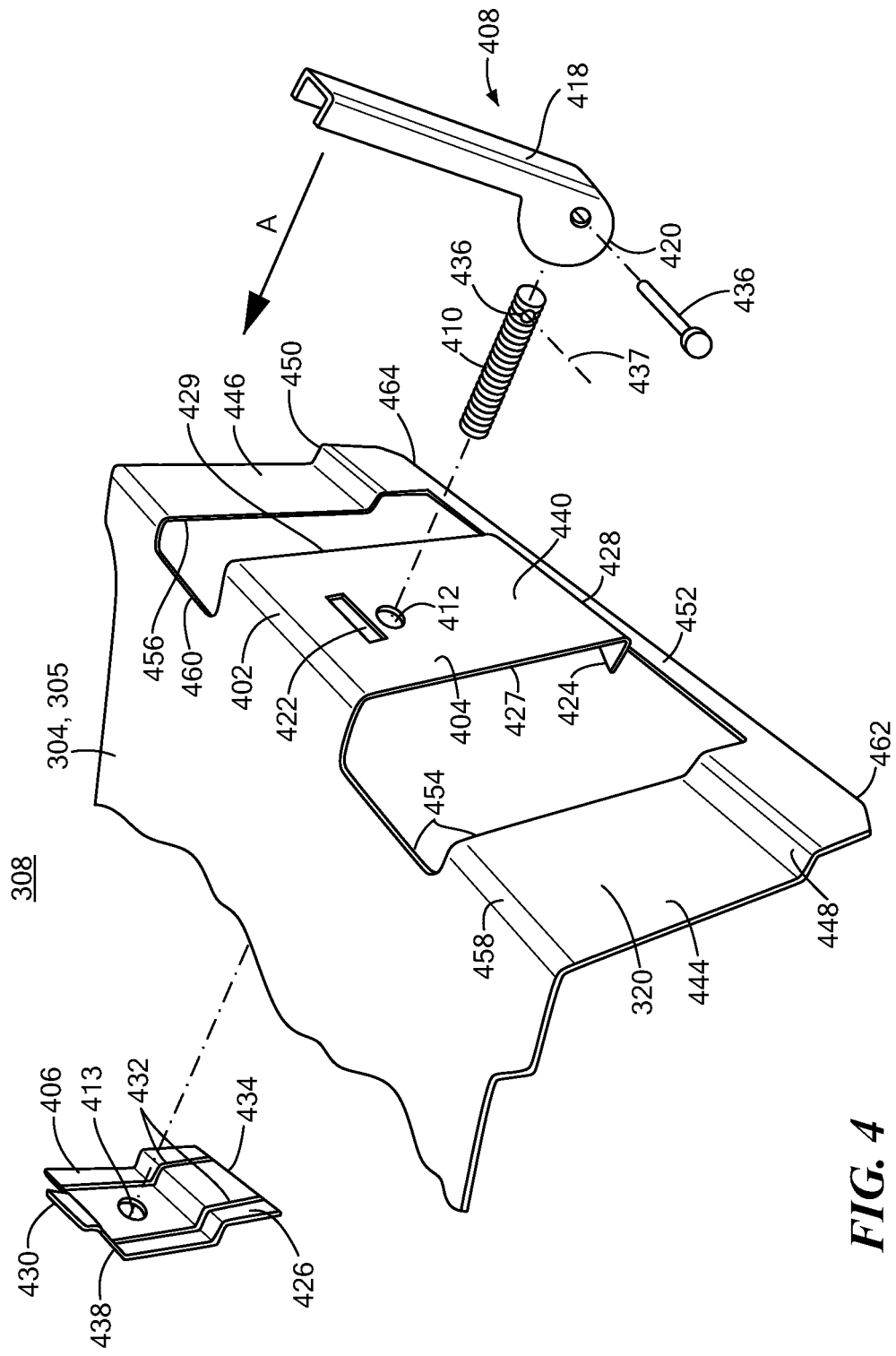
FIG. 4 is an exploded perspective view of one end of the sprinkler support assembly of FIG. 3

Referring to FIG. 4, an exploded view of the levered clamp assembly 308 is shown. The levered clamp assembly 308 is the portion of the leg 304 that connects to the ceiling support structure 106 and may be fixed to the ceiling support structure 106 by clamping two plates 404, 406 together about the beam 202. The levered clamp assembly 308 includes a first plate 404, a second plate 406, and a lever assembly 408 that connects the first plate 404 to the second plate 406, and determines their relative positions, as described further below.

In this embodiment, the first plate 404 extends integrally from and is generally perpendicular to the cross portion 305 of the leg 304 of the sprinkler support assembly 302 and has a flat, rectangular shape. The first plate 404 includes a rod opening 412 which is disposed between an attached edge 402 and a free edge 428 of the first plate 404. The rod opening 412 is unthreaded and is of slightly larger diameter than the outer diameter of the rod 410. The first plate 404 includes a tongue opening 422 which is disposed between the attached edge 402 of the first plate 404 and the rod opening 412. In addition, triangular shaped pointed protrusions 424 extend inward toward the second plate 406 from the free edge 428. For example, a protrusion 424 may be provided adjacent respective side edges 427, 429 of the first plate 404. The pointed protrusions 424 extend generally parallel to the cross portion 305 of the leg 304 and are configured to engage the corresponding beam 202 when the levered clamp assembly 308 is actuated.

The second plate 406 is hinged to and extends from the first plate 404. The second plate 406 is not permanently affixed to the sprinkler support assembly 302, such that it is separable from the levered clamp assembly 308. The second plate 406 includes a hinge edge 438 at one end, and a free edge 434 at the opposed end. A tongue 430 extends from the hinge edge 438. The tongue 430 is a curved member and is configured to be received within the tongue opening 422 to provide the hinged connection between the second plate 406 and the first plate 404. In particular, the second plate 406 rotates on the curved surface of the tongue 430 relative to the first plate 404. In addition, its curved shape retains the tongue 430 in the tongue opening 422.

In some embodiments, the second plate 406 can include stiffening ridges 432. The stiffening ridges 432 extend perpendicular to and between the free edges 438, 434 of the second plate 406 to ensure that the second plate 406 does not flex when the levered clamp assembly 308 is secured to the beam 202. Alternatively, the second plate 406 can be configured to have sufficient thickness to prevent flexion when the levered clamp assembly 308 is secured to the beam 202.

In addition, the second plate 406 includes a threaded rod opening 413 and a protrusion 426. The protrusion 426 is located between the middle portion of the plate and the free edge 434, and extends inward toward the first plate 404 along the width of the free edge 434 of the plate 406. The protrusion 426 engages the beam 202 when the levered clamp assembly 308 is actuated. In some embodiments, the second plate 406 can include additional protrusions similar to the triangular shaped pointed protrusions 424 included on the first plate 404.

The lever assembly 408 includes a threaded rod 410 that passes through corresponding rod openings 412, 413 in each plate 404, 406, and a lever 418. The lever 418 includes a cam surface 420. The lever 418 is pivotally connected to the end of the rod 410 by a pin 436 and the rotational axis 437 of the lever 418 is eccentric relative to the periphery of the cam surface 420. The cam surface 420 of the lever 418 has a generally semi-circular peripheral shape. When the levered clamp assembly 308 is assembled, the cam surface 420 abuts the outward-facing surface 440 of the first plate 404. The lever 418 rotates about the pin 436 between an open position and a closed position, as discussed further below.

The rod 410 extends through both the rod opening 412 of the first plate 404 and the rod opening 413 of the second plate 406. The threads of the rod 410 are configured to engage the threads of the rod opening 413 of the second plate 406. By rotating the threaded rod 410, the amount of space between the plates 404, 406 can be adjusted to make the clamp connection more secure.

Figure 5A:
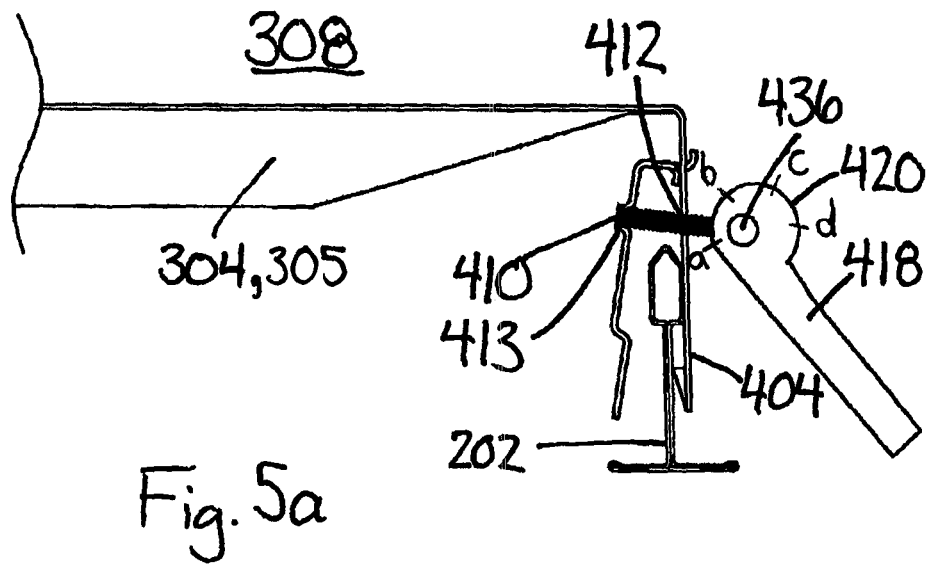
FIG. 5a is a side view of the levered clamp assembly of FIG. 3 showing the levered clamp in the open position.

Referring to FIG. 5a, although the cam surface 420 is generally semi circular, it can be seen in the figure that the periphery of the cam surface 420 actually deviates from the circular shape. In particular, the cam surface 420 is formed of different sections: the section between points a and b (a-b), the section between points b and c (b-c), and the section between points c and d (c-d). Each section is shaped to perform a specific function during actuation of the levered clamp assembly 408.

Section a-b of the cam surface 420 has a generally flat shape and ensures that the lever 418 is freely movable and adjustable when the levered clamp assembly 408 is in the open position as in FIG. 5a.

When the lever assembly 408 is actuated, the cam surface 420 of the lever 418 rotates about the eccentric rotational axis 437 and creates a camming action against the first plate 404. The camming action is facilitated by the shape of section b-c of the cam surface 420. During actuation of the lever assembly 408, section b-c gradually increases the distance between the abutment of the cam surface 420 and the outward-facing surface 440 of the first plate 404 and the eccentric rotational axis 437 of the lever 418. This camming action pulls the rod 410 toward the lever 418 along the axis A, thereby reducing the spacing between the plates 404, 406 by pulling the second plate 406 toward the first plate 404. The extent of the camming action is determined by the combination of the distance between the periphery of section b-c-d of the cam surface 420 and the location of the pin 436. The reduction in spacing causes the plates 404, 406 and their corresponding protrusions 424, 426 to engage the beam 202.

The distance between the periphery of section c-d of the cam surface 420 and the eccentric rotational axis 437 is designed to be slightly less than that of section b-c. Rotating the lever 418 so that section c-d abuts the outward-facing surface 440 of the first plate 404 causes the distance between the abutment of the cam surface 420 and the outward-facing surface 440 of the first plate 404 to slightly decrease relative to the eccentric rotational axis 437. Decreasing this distance locks the lever 418 in place. In this way, the sprinkler support assembly 302 is secured to a ceiling support structure 106.

Again, referring to FIG. 4, the seating frame 320 is shown. The seating frame 320 provides lateral stability to the sprinkler support assembly 302 and determines the height 210 of the levered clamp assembly 308 relative to the beam 202. The seating frame 320 is generally U-shaped and includes a first seating frame member 444 and a second seating frame member 446, each including a corresponding protrusion 448, 450, corresponding attached edges 458, 460 and corresponding free edges 462, 464. A connecting member 452 extends from an inside edge 454 of the first seating frame member 444 to an inside edge 456 of the second seating frame member 446 whereby the overall width of the seating frame 320 corresponds to the width of the leg 304. As viewed in the direction of arrow A, the seating frame 320 generally surrounds a periphery of the first plate 404.

In this embodiment, the first seating frame member 444 and the second seating frame member 446 both extend integrally from, and in a direction generally normal to the cross portion 305 of the leg 304 of the sprinkler support assembly 302 so as to be generally parallel to the first plate 404. However, the first seating frame member 444 and the second seating frame member 446 are not coplanar with the first plate 404 but instead are inwardly offset relative to the first plate 404. The first and second seating frame members 444, 446 are positioned adjacent to opposing lateral sides 316, 318 of the cross portion 305 of the leg 304 of the sprinkler support assembly 302.

Protrusions 448, 450 are disposed in the middle portion of each of the seating frame members 444, 446 between the attached edges 458, 460 and the free edges 462, 464. The protrusions 448, 450 extend away from and perpendicular to the cross portion 305 of the leg 304. The protrusions 448, 450 also extend along the width of the corresponding free edges 462, 464. When the sprinkler support assembly 302 is positioned about the beam 202, the protrusions 448, 450 engage the beam 202 on the side of the beam 202 opposite the first plate 404.

The connecting member 452 extends between the inside edge 454, 456 of each of the seating frame members 444, 446. The connecting member 452 provides rigidity to the seating frame 320. When in use, the connecting member 452 and the seating frame members 444, 446 rest on the beam, determining the height 210 of the levered clamp assembly 308 relative to the beam 202.

During deployment of the sprinkler system 100, the seating frame members 444, 446 and the connecting member 452 of the seating frame 320 interact with the beam 202 to secure the sprinkler support assembly 302 to the beam 202 and to maintain the alignment of the sprinkler head fitting 120 by preventing the sprinkler support assembly 302 from rotating about the levered clamp assembly 308.

Referring to FIG. 5a, the levered clamp assembly 308 is shown in the open position. In the open position, the cam surface 420 of the lever 418 is not engaged with the first plate 404 and the distance between the rotational axis 437 of the pin 436 and the surface of the lever 418 closest to the first plate 404 is relatively small. Thus, the rod 410 has not been pulled toward the lever 418 through the rod opening 412 of the first plate 404. The distance between the lever 418 and the second plate 406 can be adjusted by rotation of the rod 410 about its longitudinal axis within the opening 413. Depending on the adjustment of the rod 410 within the opening 413 of the second plate 406, a space is provided between the first and second plates 404, 406 and the levered clamp assembly 308 can be positioned relative to or removed from the beam 202 if desired.

Figure 5B:
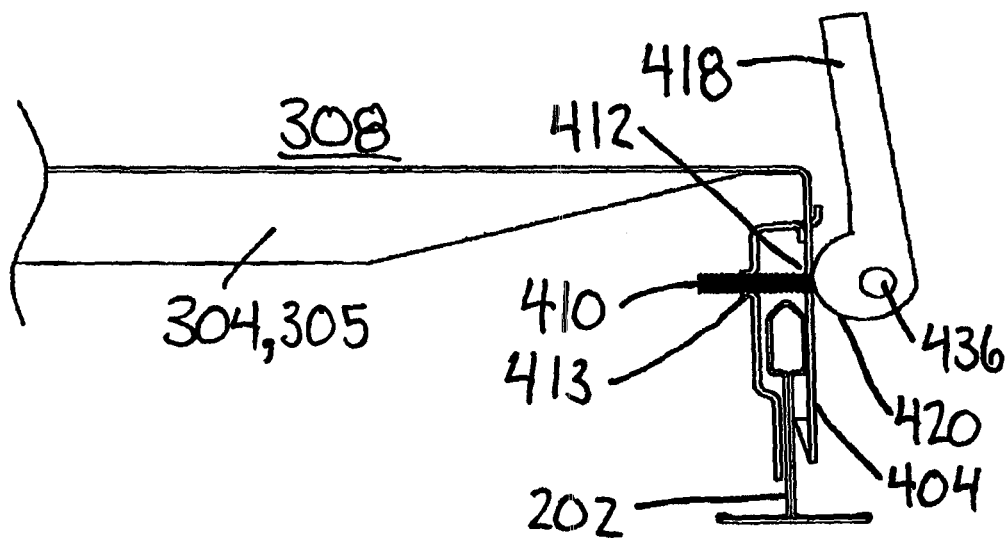
FIG. 5b is a side view of the levered clamp assembly of FIG. 3 showing the levered clamp in the closed position.

Referring to FIG. 5b, the levered clamp assembly 308 is shown in the closed position. In the closed position, the cammed surface 420 of the lever 418 is engaged with the first plate 404 and the distance between the rotational axis 437 of the pin 436 and the cam surface 420 is relatively large. Thus, the rod 410 is pulled toward the lever 418 through the rod opening 412 of the first plate 404. The rod 410 pulls the second plate 406 toward the first plate 404, thus reducing the spacing between the first and second plates 404, 406 and securing the levered clamp assembly 308 to the beam 202.

The above described sprinkler support assembly 302 is secured within a ceiling structure 106 using a quick release-type levered clamp 308 that enables sprinkler system installers to quickly install, position, and uninstall sprinkler support assemblies 302. The amount of time and labor required to install or modify a fire sprinkler support assembly 302 will thus be reduced relative to some prior art support assemblies that are secured to a ceiling structure 106 by screws or bolts.

The levered clamps 308 are designed to hold a sprinkler head 114 firmly in place during operation by resisting side, rotational, and torsional forces. The clamping force of the levered clamps 308 in combination with both the contact surface afforded by use of plates 404, 406 and protrusions 424, 426 which grip beams 202 are sufficient to prevent unintended release of the sprinkler support assembly 302. Additionally, the seating frame 320 ensures that the sprinkler support assembly 302, and thus the sprinkler head fitting 120 remains aligned and stable during operation of the sprinkler system 100.

Although the first and second plates 404, 406 are disclosed as being two separate members, the levered clamp assembly 308 is not limited to this configuration. For example, in an alternative embodiment (not shown), the second plate 406 may be formed as a partial cut out portion of the first plate 404 that is folded back over a portion of the first plate 404. Instead of being hinged to the first plate 404 as described above, the second plate 406 extends integrally from the first plate 404 and can rotate relative to the first plate 404 about an attached edge due to the flexibility of the material from which the plate is fabricated.

Figure 6:
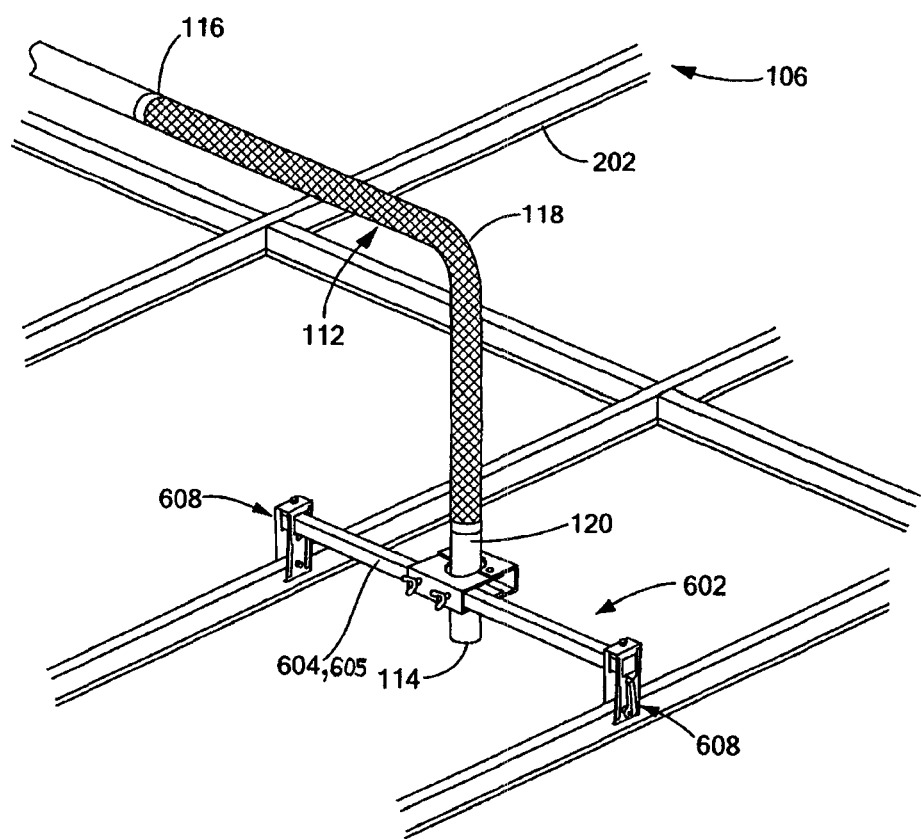
FIG. 6 is a perspective view of a second embodiment of a sprinkler support assembly attached to a ceiling support structure.
Figure 7:
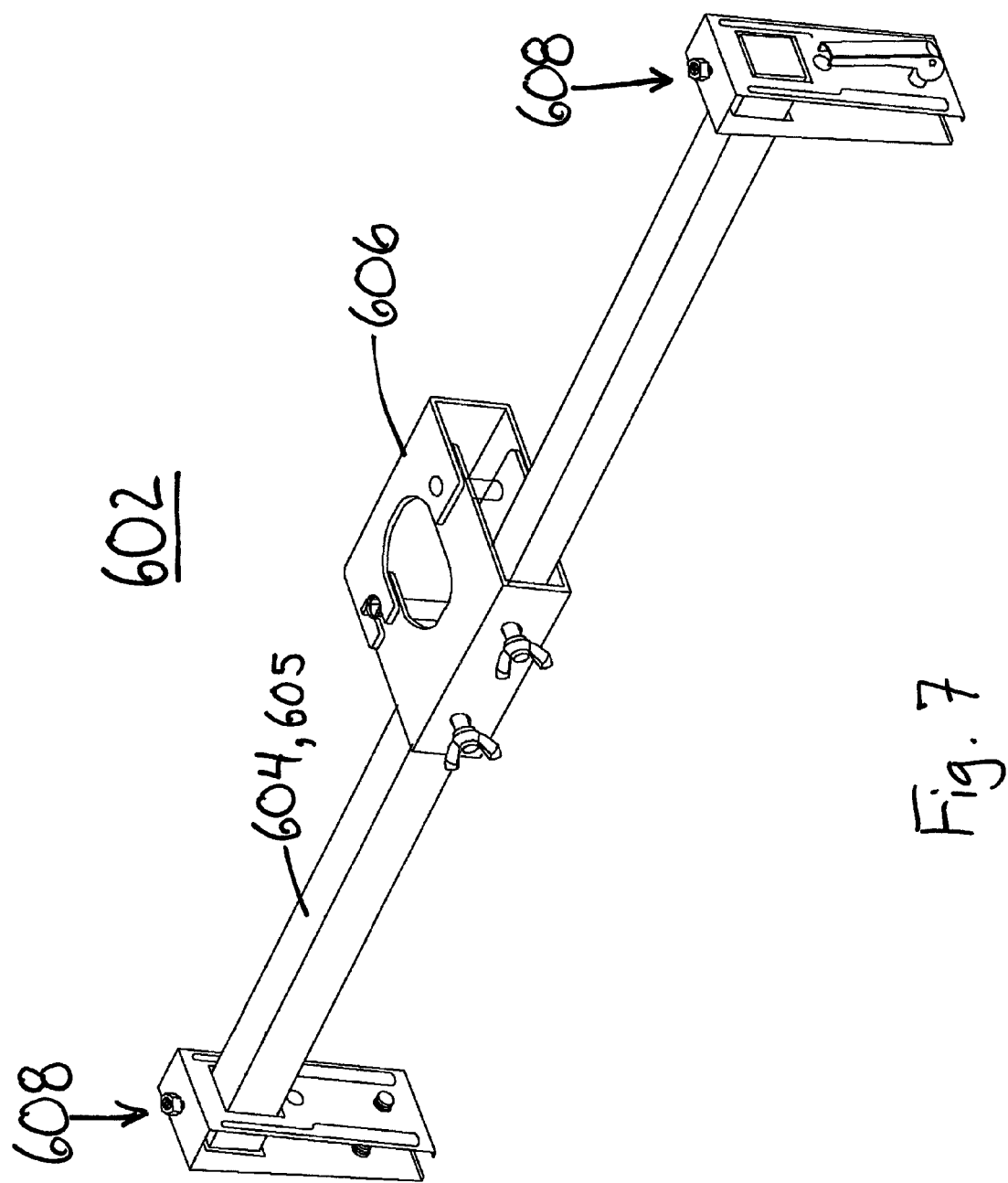
FIG. 7 is a perspective view of the sprinkler support assembly of FIG. 6 including levered clamps.

Referring to FIGS. 6 and 7, an alternative embodiment of a sprinkler support assembly 602 is mounted within a ceiling support structure 106, which, in this example is a T-bar grid. The sprinkler support assembly 602 includes a leg 604 and a hub assembly 606. Opposed ends of the leg 604 include levered clamp assemblies 608 through which the cross portion 605 of the leg 604 is supported. The support assembly 602 is rigidly secured to the ceiling support structure 106 by the levered clamp assemblies 608. The levered clamp assemblies 608 are configured to engage with a beam 202 of a ceiling support structure 106 and secure the sprinkler support assembly 602 to the beam 202, as discussed further below.

The cross portion 605 of the leg 604 is in the form of a bar that extends generally parallel to the ceiling support structure 106. The cross portion 605 of the leg 604 is also dimensioned to extend across a pair of adjacent parallel T-bar beams 202. The leg 604 of the sprinkler support assembly 602, including the levered clamp assemblies 608, is configured to resist the forces imparted to sprinkler head 114 during its operation. As a result, stability of the sprinkler support assembly 602 is ensured and the sprinkler head 114 is prevented from moving or rotating in any direction during operation.

The leg 604 supports a hub assembly 606 which is similar in form and operation to that of previously described hub assembly 306.

Figure 8:
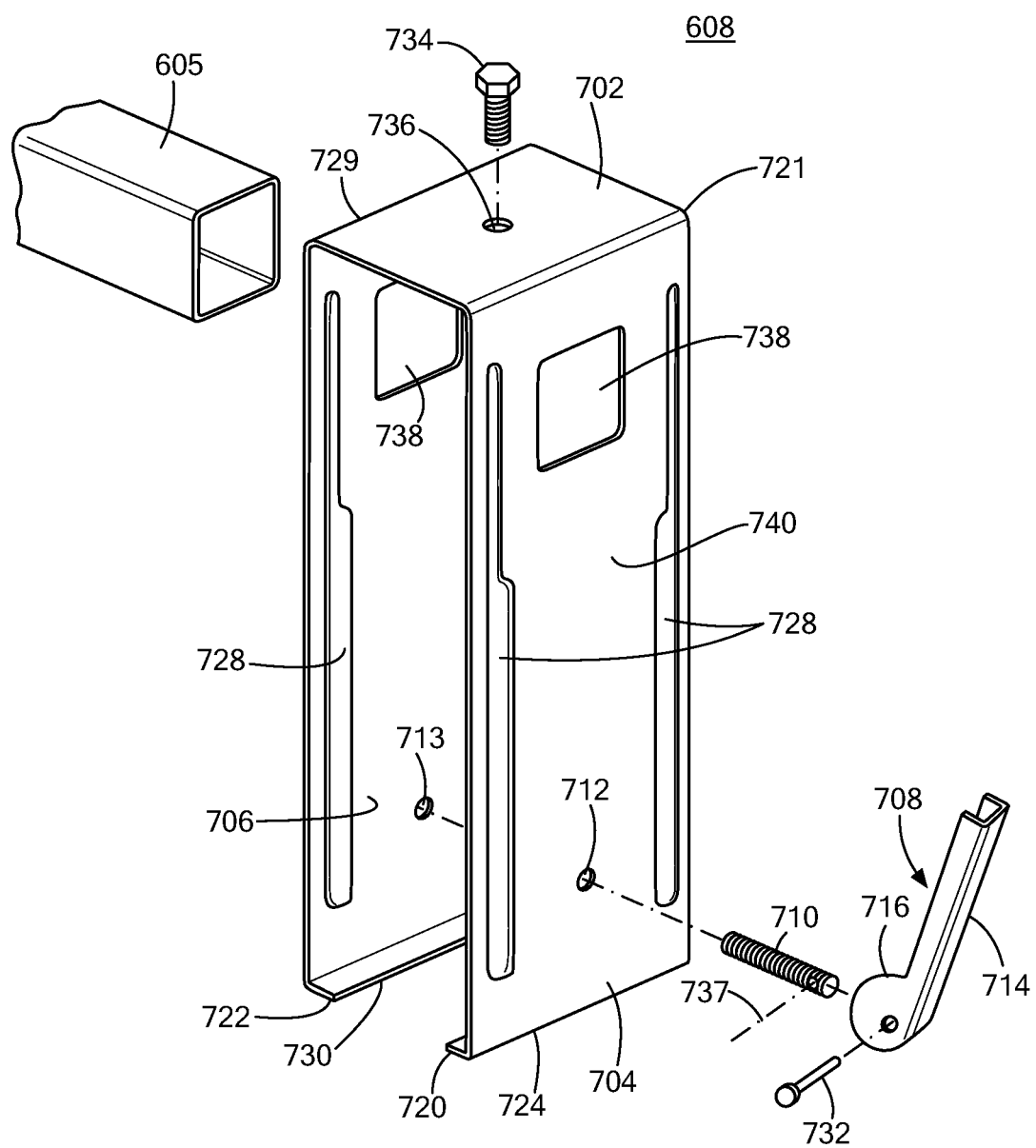
FIG. 8 is an exploded perspective view of one end of the sprinkler support assembly of FIG. 7.

Referring to FIG. 8, an exploded view of the levered clamp assembly 608 is shown. The levered clamp assembly 608 includes a base 702, a first plate 704 and a second plate 706. The base 702 extends generally parallel to the cross portion 605 of the leg 604. Each plate 704, 706 extends from opposed ends of and generally perpendicular to the base 702, forming a U-shaped member. The levered clamp assembly 608 also includes a lever assembly 708. The lever assembly 708 includes a threaded rod 710 that passes through corresponding rod openings 712, 713 in each plate 704, 706, and a lever 714 pivotally connected to one end of the rod 710. The lever 714 includes a cam surface 716 that is in contact with the first plate 704. Additionally, the first plate 704 and the second plate 706 each include a leg opening 738 that accepts the cross portion 605 of the leg 604 of the sprinkler support assembly 602.

The first plate 704 includes a base end 721 joined to the base 702, and a free end 724 that is opposed to the base end 721. A leg opening 738 is disposed near the base 702 end of the plate 704 and configured to accommodate the size and shape of the cross portion 605 of the leg 604 of the sprinkler support assembly 602. In addition, the first plate 704 includes a rod opening 712 disposed between the leg opening 738 and the free edge 724. The rod opening 712 is unthreaded and is of larger diameter than the outer diameter of the rod 710.

The first plate 704 also includes a protrusion 720 disposed on the free edge 724 of the plate 704. The protrusion 720 extends inwards toward the second plate 706 and along the entire width of the first plate 704. The protrusion 720 extends generally perpendicular to the first plate 704. The first plate 704 can also include stiffening ridges that extend perpendicular to the base 702 along the length of the first plate 704 between the base end 721 and the free end 724 and are configured to prevent the plate 704 from flexing. Alternatively, the first plate 704 can be configured to have sufficient thickness to prevent flexion when the levered clamp assembly 608 is secured to the beam 202. The second plate 706 is substantially a mirror image of the first plate 704. In particular, the second plate 706 includes a leg opening 738 disposed near the base 702 end of the plate 706 and configured to accommodate the cross portion 605 of the leg 604 of the sprinkler support assembly 602. In addition, the second plate 706 includes a rod opening 713 disposed between the leg opening 738 and the free edge 730. However, the second plate 706 differs from the first plate 704 in that the opening 713 is threaded, the threads configured to engage with the threads of the rod 710. The second plate 706 also includes a protrusion 722 disposed on the free edge 730 of the plate 706. The protrusion 722 extends inwards toward the first plate 704 and along the entire width of the second plate 706. The protrusion 722 extends generally perpendicular to the second plate 706. The second plate 706 can also include stiffening ridges 728 that extend perpendicular to the base 702 along the length of the second plate 706 between the base and the free ends 729, 730, and are configured to prevent the plate 706 from flexing. Alternatively, the second plate 706 can be configured to have sufficient thickness to prevent flexion when the levered clamp assembly 608 is secured to the beam 202.

The lever assembly further includes a lever 714 disposed on one end of the rod 710. The lever 714 is pivotally connected to the end of the rod 710 by a pin 732 and the rotational axis 737 of the lever 714 is eccentric relative to the periphery of the cam surface 716. The cam surface 716 of the lever 714 has a semi-circular peripheral shape. When the levered clamp assembly 608 is assembled, the cam surface 420 abuts the outward-facing surface 740 of the first plate 704. The lever 714 rotates about the pin 732 between an open position and a closed position, as described above with respect to FIGS. 5a and 5b.

The rod 710 extends through both the rod opening 712 of the first plate 704 and the threaded rod opening 713 of the second plate 706. The threads of the rod 710 are configured to engage the threads of the threaded rod opening 713 of the second plate 706. By rotating the threaded rod 710, the amount of space between the plates 704, 706 can be adjusted to make the clamp connection more secure.

The cam surface 716 of the lever 714 has the same shape and functionality as the cam surface 420 described in the first embodiment.

When the lever assembly 708 is actuated, the cam surface 716 of the lever 714 rotates about the eccentric rotational axis 737 and creates a camming action against the first plate 704. The camming action reduces the spacing between the first plate 704 and the second plate 706 by pulling the second plate 706 toward the first plate 704. The reduction in spacing causes the plates 704, 706 and their corresponding protrusions 720, 722 to engage the beam 202. In this way, the levered clamp assembly 708 is secured to a ceiling support structure 106.

The U-shaped member including the base 702, first plate 704, and second plate 706 of the levered clamp assembly 608 is secured to the cross portion 605 of the leg 604 by a fastener such as a positioning screw 734 that is received in a positioning screw opening 736 in the base 702. The positioning screw opening 736 is generally centrally located on the base 702. The levered clamp assembly 608 can be positioned along the length of the cross portion 605 of the leg 604 by loosening the positioning screw 734 and sliding the levered clamp assembly 608 along the length of the cross portion 605 of the leg 604 in the desired direction. The levered clamp assembly 608 is maintained in the desired position on the cross portion 605 of the leg 604 by rotation of the positioning screw 734 to an extent that an end of the screw 734 is urged against a surface of the cross portion 605 of the leg 604.

The above described sprinkler support assembly 602 is secured within a ceiling structure 106 using a quick release-type levered clamp 608 that enables sprinkler system installers to quickly install, position, and uninstall sprinkler support assemblies 602. The amount of time and labor required to install or modify a fire sprinkler support assembly 602 will thus be reduced relative to some prior art support assemblies that are secured to a ceiling structure 106 by screws or bolts.

The levered clamps 608 are designed to hold a sprinkler head 114 firmly in place during operation by resisting side, rotational, and torsional forces. The clamping force of the levered clamps 608 in combination with both the contact surface afforded by use of plates 704, 706 and the protrusions 720, 722 which grip beams 202 are sufficient to prevent unintended release of the sprinkler support assembly 602.

Referring to FIGS. 3-5, the method of mounting a sprinkler support assembly 302 to a ceiling support structure 106 will be described. The ceiling support structure 106 may consist of T-bar beams 202. First, a person installing the fire sprinkler system 100 rotates the lever 418 of each of the levered clamp assemblies 308 to the open position as is shown in FIG. 5a.

With the levered clamp assemblies 308 in the open position, the levered clamp assemblies 308 of the sprinkler support assembly 302 are fitted onto the corresponding beams 202 of the ceiling support structure 106. Fitting the levered clamp assemblies 308 onto the beams 202 may include manually spreading the plates 404, 406 of the levered clamp assemblies 308 by rotating the second plate 406 on the tongue 430 to obtain adequate spacing to accept the beam 202.

When the sprinkler support assembly 302 is in the desired location within the ceiling support structure 106, the spacing between the plates may be adjusted by rotation of the threaded rod 410. Then the lever 418 is rotated into the closed position as is shown in FIG. 5b.

Closing the levered clamp assembly 308 causes a camming action between the cam surface 420 and the first plate 404. The camming action pulls the rod 410 in the direction of the lever 418, thereby pulling the second plate 406 toward the first plate 404. As the plates 404, 406 are pulled together the protrusions 424, 426 engage the beam, securing the sprinkler support assembly 302 to the ceiling support structure 106.

The alternative embodiment of the sprinkler support assembly 602 is generally used in the same way. However, the position of the levered clamp assemblies 608 can be adjusted along the length of the cross portion 605 of the leg 604 before they are fitted onto the beams 202. This adjustment is accomplished by loosening the positioning screw 734 and sliding the levered clamp assembly 608 along the length of cross portion 605 of the leg 604 in the desired direction. The levered clamp assembly 608 is maintained in the desired location on the cross portion 605 of the leg 604 by rotation of the positioning screw 734 to an extent that the end of the screw 734 is urged against a surface of the cross portion 605 of the leg 604.

A selected illustrative embodiment of the invention is described above in some detail. It should be understood that only structures considered necessary for clarifying the present invention have been described herein. Other conventional structures, and those of ancillary and auxiliary components of the system, are assumed to be known and understood by those skilled in the art. Moreover, while a working example of the present invention has been described above, the present invention is not limited to the working example described above, but various design alterations may be carried out without departing from the present invention as set forth in the claims.

We claim:

1. A fire sprinkler support assembly for supporting a flexible fire sprinkler fitting within a ceiling structure having parallel spaced beams, the support assembly comprising:
    a leg configured to extend transverse to each of a pair of adjacent ones of the parallel spaced beams, the leg including:
    a cross portion; and
    a levered clamp assembly for connecting and supporting an end of the cross portion of the leg to a corresponding one of the beams, the levered clamp assembly including:
    a first plate extending from and generally perpendicular to the cross portion of the leg;
    a second plate extending generally parallel to the first plate;
    the second plate being rotatable relative to the first plate;
    the first plate and the second plate configured to be disposed on opposing sides of a corresponding one of the beams such that the plates straddle the beam; and
    a lever assembly including:
    a rod passing through corresponding rod openings in each of the first and second plates; and
    a lever pivotally connected to one end of the rod, the lever including a cam surface disposed adjacent to the first plate, wherein the lever assembly is configured to reduce spacing between the plates upon actuation of the lever, whereby the leg is secured to the beam;

wherein the support assembly further comprises a seating frame, the seating frame comprising:
first and second seating frame members extending perpendicular to the cross portion of the leg;
a first protrusion included on the first seating frame member;
a second protrusion included on the second seating frame member; and
a connecting member configured to connect the first and second seating frame members.

2. The support assembly of claim 1, wherein the rod is threaded and the rod opening of the second plate is threaded and configured to engage the threaded rod.

3. The support assembly of claim 1, wherein the cam surface includes a generally semi-circular peripheral shape.

4. The support assembly of claim 1, wherein a rotational axis of the lever is eccentric relative to the periphery of the cam surface.

5. The support assembly of claim 1, wherein the lever is pivotally connected to the rod by a pin.

6. The support assembly of claim 1, further comprising the parallel-spaced beams, each beam in the form of T-bar.

7. The support assembly of claim 1, wherein the second plate has a protrusion for engaging the beam.

8. The support assembly of claim 7, wherein the protrusion extends along a width of the plate.

9. The support assembly of claim 1, wherein the first plate has a protrusion for engaging the beam.

10. The support assembly of claim 9, wherein the protrusion terminates in a point.

11. The support assembly of claim 1, wherein the second plate includes stiffening ridges.

12. The support assembly of claim 1, wherein the second plate is hinged to the first plate.

13. The support assembly of claim 1, further comprising a hub assembly wherein the hub assembly includes a primary support mounted to the leg, and a secondary support member rotatable relative to a primary support member between an open position and a closed position, and in the closed position, cut outs formed in the primary support cooperate together with cut outs formed in the secondary support to define a hub opening.

14. A fire protection sprinkler system comprising the support assembly of claim 13 and a flexible sprinkler assemblage, the flexible sprinkler assemblage including the flexible fire sprinkler fitting including a first end configured to connect to a flexible fluid supply line, and a second end configured to connect to a fire sprinkler head, and a flexible fluid supply line connected to the first end, wherein a portion of the flexible fire sprinkler fitting is disposed in the hub opening.

15. A fire sprinkler support assembly for supporting a flexible fire sprinkler fitting within a ceiling structure having parallel spaced beams, the support assembly comprising:
a leg configured to extend transverse to each of a pair of adjacent ones of the parallel spaced beams, the leg including:
a cross portion; and
a levered clamp assembly for connecting and supporting an end of the cross portion of the leg to a corresponding one of the beams, the levered clamp assembly including:
a first plate extending from and generally perpendicular to the cross portion of the leg;
a second plate extending generally parallel to the first plate;
the second plate being rotatable relative to the first plate;
the first plate and the second plate configured to be disposed on opposing sides of a corresponding one of the beams such that the plates straddle the beam; and
a lever assembly including:
a rod passing through corresponding rod openings in each of the first and second plates; and
a lever pivotally connected to one end of the rod, the lever including a cam surface disposed adjacent to the first plate, wherein the lever assembly is configured to reduce spacing between the plates upon actuation of the lever, whereby the leg is secured to the beam;
wherein the second plate includes a tongue configured to protrude through a tongue opening in the first plate, the second plate rotatable relative to the first plate on the tongue.

16. The support assembly of claim 15, wherein the tongue includes a curved portion configured to maintain the connection between the first plate and the second plate.

17. The support assembly of claim 15, wherein the tongue extends from an edge of the second plate.

18. The support assembly of claim 15, wherein the tongue opening is disposed on the first plate at a location between the cross portion of the leg and the rod opening.

19. A method of mounting the fire sprinkler support assembly to a ceiling support structure, the support assembly configured to secure a flexible fire sprinkler fitting to the ceiling support structure, the ceiling support structure including parallel spaced beams, the method comprising:
providing the support assembly including:
a leg configured to extend transverse to each of a pair of adjacent ones of the parallel spaced beams, the leg including:
a cross portion; and
a levered clamp assembly for connecting and supporting an end of the cross portion of the leg to a corresponding one of the beams, the levered clamp assembly including:
a first plate extending from and generally perpendicular to the cross portion of the leg; a second plate extending generally parallel to the first plate;
the second plate being rotatable relative to the first plate;
the first plate and the second plate configured to be disposed on opposing sides of a corresponding one of the beams such that the plates straddle the beam; and
a lever assembly including: a rod passing through corresponding rod openings in each of the first and second plates; and
a lever pivotally connected to one end of the rod, the lever including a cam surface disposed adjacent to the first plate
wherein the lever assembly is configured to reduce spacing between the plates upon actuation of the lever, whereby the leg is secured to the beam; and
positioning the support assembly such that the plates straddle the beam; and
actuating the lever to secure the levered clamp assembly to the beam whereby the spacing between the plates is reduced to an extent that the beam is compressed between the plates, clamping the support structure to the ceiling;

wherein the first plate further includes a tongue opening, and the second plate further includes a tongue configured to protrude through the tongue opening in the first plate, the second plate rotatable relative to the first plate on the tongue; and the positioning step further includes rotating the second plate on the tongue to obtain adequate spacing to accept the beam.

20. The method of claim 19 wherein the beams comprise T-bar, the plates are configured to engage a portion of the T-bar, and the actuating step further comprises engaging the portion of the T-bar beam.

21. The method of claim 19 wherein actuating the cammed lever is accomplished by rotating the lever whereby a camming action is produced between the cam surface and one of the plates.

22. The method of claim 19 wherein preceding the securing step, the method further includes adjusting the spacing between the plates by rotation of the rod.

23. The method of claim 19, wherein the second plate is hinged to the first plate.

24. A fire sprinkler support assembly for supporting a flexible fire sprinkler fitting within a ceiling structure having parallel spaced beams, the support assembly comprising:
a leg configured to extend transverse to each of a pair of adjacent ones of the parallel spaced beams, the leg including:
a cross portion; and
a levered clamp assembly for connecting and supporting an end of the cross portion of the leg to a corresponding one of the beams, the levered clamp assembly including:
a base;
a first plate and a second plate, each plate extending from and generally perpendicular to the base;
the second plate being generally parallel to the first plate;
the first plate and the second plate configured to be disposed on opposing sides of a corresponding one of the beams such that the plates are configured to straddle the beam; and
a lever assembly including:
a rod passing through corresponding rod openings in each of the first and second plates; and
a lever pivotally connected to one end of the rod, the lever including a cam surface disposed adjacent to the first plate, wherein the lever assembly is configured to reduce spacing between the plates upon actuation of the lever, whereby the leg is secured to the beam;
wherein the first plate further includes a tongue opening, and the second plate further includes a tongue configured to protrude through the tongue opening in the first plate, the second plate rotatable relative to the first plate on the tongue; and the positioning step further includes rotating the second plate on the tongue to obtain adequate spacing to accept the beam.

25. The support assembly of claim 24, wherein the rod is threaded and the rod opening of the second plate includes threads configured to engage the threaded rod.

26. The support assembly of claim 24, wherein the cam surface includes a generally semi-circular peripheral shape.

27. The support assembly of claim 24, wherein a rotational axis of the lever is eccentric relative to the periphery of the cam surface.

28. The support assembly of claim 24, wherein the lever is pivotally connected to the rod by a pin.

29. The support assembly of claim 24, further comprising the parallel-spaced beams, each beam in the form of T-bar.

30. The support assembly of claim 24, wherein the plates extend from opposed ends of the base, whereby the base and plates define a U-shaped member.

31. The support assembly of claim 24, wherein the plates have an inward protrusion for engaging the beam.

32. The support assembly of claim 31, wherein the protrusion is elongated.

33. The support assembly of claim 24, wherein the plates include stiffening ridges.

34. The support assembly of claim 24, wherein the position of the levered clamp assembly is adjustable along the cross portion of the leg.

35. The support assembly of claim 24, wherein each plate includes an opening to receive the cross portion of the leg.

36. The support assembly of claim 24, further comprising a hub assembly wherein the hub assembly includes a primary support mounted to the leg, and a secondary support member rotatable relative to a primary support member between an open position and a closed position, and in the closed position, cut outs formed in the primary support cooperate together with cut outs formed in the secondary support to define a hub opening.

37. A fire protection sprinkler system comprising the support assembly of claim 36 and a flexible sprinkler assemblage, the flexible sprinkler assemblage including the flexible fire sprinkler fitting including a first end configured to connect to a flexible fluid supply line, and a second end configured to connect to a fire sprinkler head, and a flexible fluid supply line connected to the first end, wherein a portion of the flexible fire sprinkler fitting is disposed in the hub opening.

38. A method of mounting a support assembly to a ceiling support structure, the support assembly configured to secure a flexible fire sprinkler fitting to the ceiling support structure, the ceiling support structure including parallel spaced beams, the method comprising:
providing the support assembly including:
a leg configured to extend transverse to each of a pair of adjacent ones of the parallel spaced beams, the leg including:
a cross portion; and
a levered clamp assembly for connecting and supporting an end of the cross portion of the leg to a corresponding one of the beams, the levered clamp assembly including:
a base;
a first plate and a second plate, each plate extending from and generally perpendicular to the base;
the second plate being generally parallel to the first plate;
the first plate and the second plate being disposed on opposing sides of a corresponding one of the beams, such that the plates are configured to straddle the beam;
wherein the first plate further includes a tongue opening, and the second plate further includes a tongue configured to protrude through the tongue opening in the first plate, the second plate rotatable relative to the first plate on the tongue; and the positioning step further includes rotating the second plate on the tongue to obtain adequate spacing to accept the beam; and a lever assembly including:
- a rod passing through corresponding rod openings in each of the first and second plates; and
- a lever pivotally connected to one end of the rod, the lever including a cam surface disposed adjacent to the first plate;
- wherein the lever assembly is configured to reduce spacing between the plates upon actuation of the lever, whereby the leg is secured to the beam; and positioning the support assembly such that the plates straddle the beam; and actuating the lever to secure the levered clamp assembly to the beam whereby the spacing between the plates is reduced to an extent that the beam is compressed between the plates, clamping the support structure to the ceiling.

39. The method of claim 38 wherein, the plates are configured to engage a portion of a T-bar beam and the actuating step further comprises engaging the portion of the T-bar beam.

40. The method of claim 38 wherein, actuating the cammed lever is accomplished by rotating the lever whereby a camming action is produced between the cam surface and one of the plates.

41. The method of claim 38 wherein, preceding the securing step, the method further includes adjusting the spacing between the plates by rotation of the rod.

42. The method of claim 38, wherein the positioning step further includes adjusting the position of the levered clamp assembly along the cross portion of the leg.

43. The method of claim 38, wherein the plates extend from opposed ends of the base, whereby the base and plates define a U-shaped member.

* * * * *